US011604068B2

(12) United States Patent
Gao

(10) Patent No.: US 11,604,068 B2
(45) Date of Patent: Mar. 14, 2023

(54) FLOOR SELECTION FOR STRUCTURE LOCATION TRACKING

(71) Applicant: Building Robotics, Inc., Oakland, CA (US)

(72) Inventor: Jun Gao, Saratoga, CA (US)

(73) Assignee: Building Robotics, Inc., Oakland, CA (US)

( * ) Notice: Subject to any disclaimer, the term of this patent is extended or adjusted under 35 U.S.C. 154(b) by 346 days.

(21) Appl. No.: 16/878,183

(22) Filed: May 19, 2020

(65) Prior Publication Data

US 2021/0364298 A1 Nov. 25, 2021

(51) Int. Cl.
*G01C 21/20* (2006.01)
*G06N 20/20* (2019.01)
*G06N 5/00* (2006.01)

(52) U.S. Cl.
CPC ........... *G01C 21/206* (2013.01); *G06N 5/003* (2013.01); *G06N 20/20* (2019.01)

(58) Field of Classification Search
CPC ......... G01S 5/02; G01C 21/20; G01C 21/206; H04W 4/029; H04W 4/33; G06N 20/20; G06N 5/003
See application file for complete search history.

(56) References Cited

U.S. PATENT DOCUMENTS

| | | | | |
|---|---|---|---|---|
| 2012/0315918 A1* | 12/2012 | Kadous | .................... | H04W 4/02 455/456.1 |
| 2015/0149133 A1* | 5/2015 | Do | ........................ | G01S 5/0236 703/6 |
| 2015/0264536 A1* | 9/2015 | Patil | ........................ | H04W 4/33 455/456.1 |
| 2016/0356593 A1* | 12/2016 | Huang | ..................... | H04W 4/02 |
| 2018/0007516 A1* | 1/2018 | Ge | .............................. | G01S 5/14 |
| 2018/0288585 A1* | 10/2018 | Geng | ..................... | H04W 4/021 |
| 2019/0104383 A1 | 4/2019 | Keal et al. | | |
| 2021/0400618 A1* | 12/2021 | Smith | ................. | G01S 5/02955 |

FOREIGN PATENT DOCUMENTS

| | | |
|---|---|---|
| EP | 2712488 | 4/2014 |
| EP | 3074784 | 10/2016 |

OTHER PUBLICATIONS

PCT Search Report dated Aug. 3, 2021, for PCT Application No. PCT/US202102505, 15 pages.

* cited by examiner

*Primary Examiner* — Umair Ahsan

(57) ABSTRACT

There is described a floor selection system for location tracking within a structure. A communication component receives sensor data, associated with a beacon received from a tag, from sensors. A processor identifies features based on the sensor data, identifies decision tree stumps arranged in a particular order, assigns weights to the decision tree stumps based on the features and the feature thresholds. The processor further determines whether an aggregate of the weights is greater than a resultant threshold and selects a floor location of the tag based on whether the aggregate of weights is greater than the resultant threshold. The floor location is selected from floor locations of the structure proximal to the sensors.

18 Claims, 9 Drawing Sheets

FLOOR SELECTION FOR STRUCTURE LOCATION TRACKING

FIELD OF THE INVENTION

This application relates to the field of people and asset tracking systems and, more particularly, to floor selection systems and methods for an indoor location tracking systems.

BACKGROUND

Building automation systems encompass a wide variety of systems that aid in the monitoring and control of various aspects of building operation. Building automation systems often include one or more environmental control sub-systems, such as security, fire safety, lighting, and heating, ventilation, and air conditioning ("HVAC") systems. The systems may also provide non-environmental control features for management and occupants of a building, such as indoor location tracking of people and assets.

The floor selection is a critical part of any indoor location tracking application when there is more than one floor in the building. Existing field devices of building automation systems may be used to track people and asset location. For example, the field devices may use radio frequency signaling and detection to determine the location of a particular target. However, even with such field devices, it is not a trivial task to detect the floor of the particular target since radio signals may traverse from floor-to-floor.

SUMMARY

In accordance with one embodiment of the disclosure, there is provided a floor selection approach for building automation systems. The building automation system may include at least three layers of sensor data fused together to provide a final location of a person or asset, namely radio frequency (RF) layer, a motion detection layer, and a floor plan layer. For example, the final location of a target may be established based on an RF layer of Received Signal Strength Indicator (RSSI) information from multiple sensors, a motion detection layer of passive infrared (PIR) information from the multiple sensors, and a detailed indoor floor plan of the structure. The floor selection approach applies a particular set of features to a machine learning classifier to effectively determine a floor location of the target within the structure.

One aspect is a floor selection system for location tracking within a structure comprising a communication component and a processor. The communication component is configured to receive sensor data from multiple sensors. The sensor data is associated with a beacon received by the multiple sensors from a tag. The processor is configured to identify multiple features based on the sensor data and identify multiple decision tree stumps arranged in a particular order. The decision tree stumps include multiple feature thresholds. The processor is also configured to assign weights to the multiple features based on the multiple features and the multiple feature thresholds. The processor is further configured to determine whether an aggregate of the weights is greater than a resultant threshold and select a floor location of the tag based on whether the aggregate of weights is greater than the resultant threshold. The floor location is selected from multiple floor locations of the structure proximal to the multiple sensors.

Another aspect is a floor selection method for location tracking within a structure. Sensor data is received from multiple sensors. The sensor data is associated with a beacon received by the multiple sensors from a tag. Multiple features are identified in response to receiving the sensor data from the multiple sensors. Multiple decision tree stumps arranged in a particular order are identified, in which the multiple decision tree stumps includes multiple feature thresholds. Weights are assigned to the multiple features based on the multiple features and the multiple feature thresholds. The method determines whether an aggregate of the weights is greater than a resultant threshold and selects a floor location of the tag in response to determining whether the aggregate of weights is greater than the resultant threshold. The floor location is selected from multiple floor locations of the structure proximal to the multiple sensors.

The above described features and advantages, as well as others, will become more readily apparent to those of ordinary skill in the art by reference to the following detailed description and accompanying drawings. While it would be desirable to provide one or more of these or other advantageous features, the teachings disclosed herein extend to those embodiments which fall within the scope of the appended claims, regardless of whether they accomplish one or more of the above-mentioned advantages.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects.

DETAILED DESCRIPTION

Figure 1:
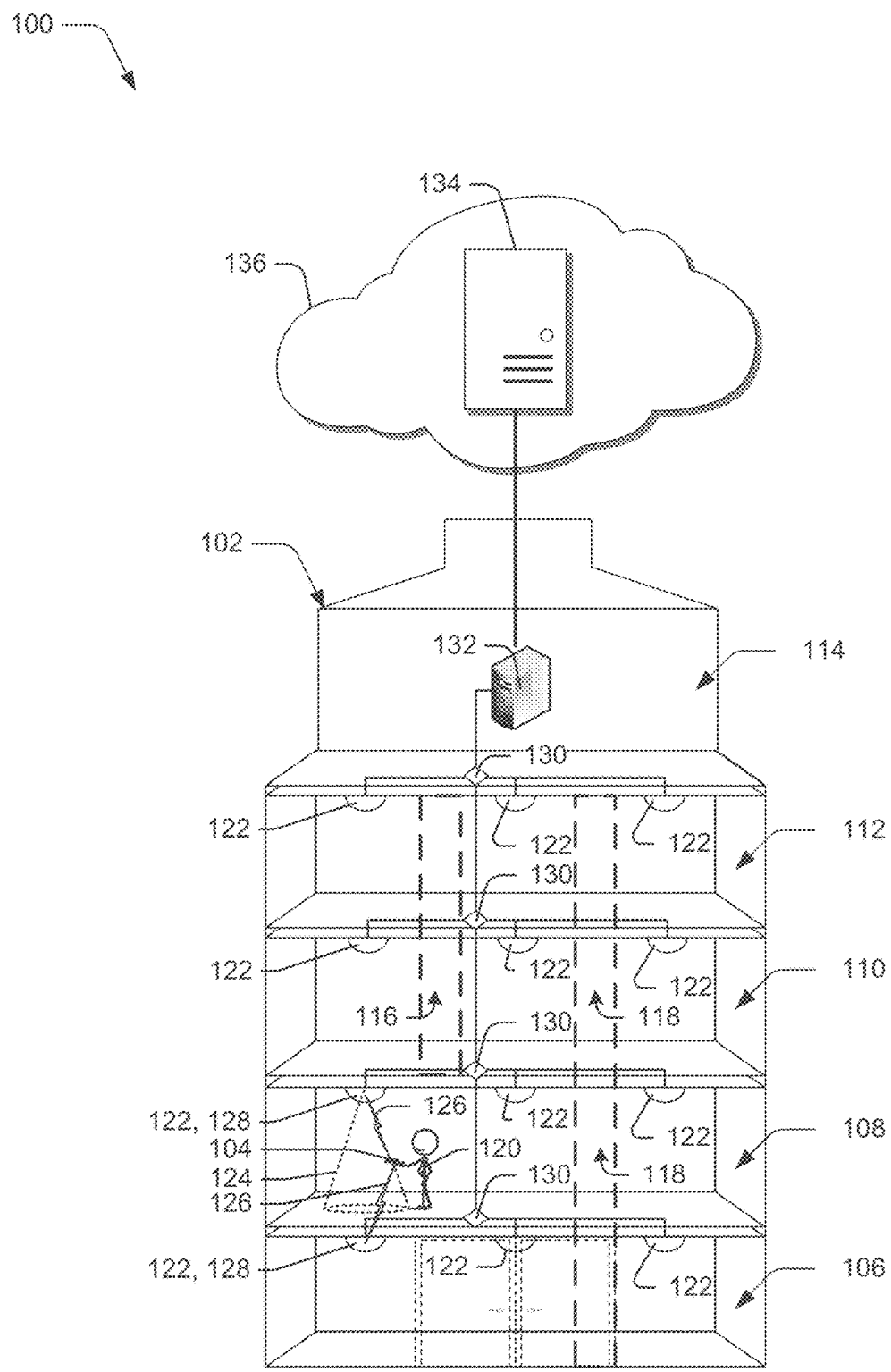
FIG. 1 is an illustration of an environment in an example implementation that is operable to employ techniques described herein.

Various technologies that pertain to systems and methods that facilitate floor selection system will now be described with reference to the drawings, where like reference numerals represent like elements throughout. The drawings discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus. It is to be understood that functionality that is described as being carried out by certain system elements may be performed by multiple elements. Similarly, for instance, an element may be configured to perform functionality that is described as being carried out by multiple elements. The numerous innovative teachings of the present application will be described with reference to exemplary non-limiting embodiments.

Conventional systems are difficult to update and retrain in the field due to the complexity of training machine language-based system. Although many different analytical and machine learning (ML) techniques may be applied for the floor selection system, some techniques may work more efficiently than others. For example, some machine language techniques may utilize simple "weak" learners, such as decision-tree stumps (i.e., 1 level decision trees), are less prone to overfitting and relatively efficient with computation and memory resources. The floor selection system includes improvements described herein that may be applied to various techniques, including machine language techniques with weak learners, in order to implement specific application, computation, and memory functions. One function is the capability to update and train the classifier online, i.e., via a remote device communicating with the sensors, so that the system may be adaptive to the new or changed environments. Another function is to use only decision tree stumps as weak classifiers. The final classifier built on decision tree stumps has a simplest decision at each stage, namely one comparison with the threshold and characterized into two groups. Thus, the final classifier's computational complexity is linear with the number of tree stumps used.

Referring to FIG. 1, there is shown a floor selection system 100 of a structure 102, which may be a sub-system of a location determining system or other type of building automation system. For example, a location determining system may establish a location of one or more tags 104 within the structure 102, such as an indoor area and other defined space. The structure 102 may include various partitioned or designated areas, such as floors 106-114, transports 116-118, rooms, hallways, and defined open areas associated with the facility. Each tag 104 may be co-located and/or supported by an object 120, such as a person or asset. Each floor 106-114 of the facility may include one or more sensors 122 positioned at fixed locations throughout the floor. The sensors 122 may be evenly distributed throughout each floor 106-114 or selectively distributed in a non-even manner, as may be preferred for tag detection. Each transport may be located with the structure 102 to allow movement between floors 106-114 by objects 120. Examples of transports include, but are not limited to, elevators, escalators, stairs, ladders, and any other building construction that is detectable or notable by the sensors 122.

The sensors 122 includes multiple sensor components to detect aspects of its proximal environment. Each sensor may include a motion sensor to detect a tag 104 or object 120 moving within its proximity. For example, a sensor 122 mounted at a ceiling of a floor 106-114 may have a field of view 124 that is directed downward to detect motion of an object 120 within that field of view. Each sensor may also include a radio frequency receiver to detect beacons 126 broadcast by one or more sources associated with positions of tags 104 and/or objects 120. In particular, an occupant may carry tag 104 for detection by the sensors 122, among other purposes, to facilitate location detection of the occupant. Each tag 104 may be any type of transportable device capable of wireless communication with sensors 122 of the structure 102. Examples of tags 104 include, but are not limited to, mobile devices, remote controls, identification tags, wearables, wireless communication devices, tablets, portable computing devices, and any other type of transportable device including circuitry for transmitting a beacon 126. Wireless communication technologies that may be used to transmit the beacon include, but are not limited to, Bluetooth (including BLE), ultrawide band (UWB), Wi-Fi (including Wi-Fi Direct), IEEE 802.15.4, Z-Wave, 6LoW-PAN, Near-Field Communication, other types of electromagnetic radiation of a radio frequency wave, light-based communications (including infrared), acoustic communications, and any other type of peer-to-peer technology, may be utilized for implementing the techniques described herein.

A tag 104 may broadcast a beacon 126 to sensors 122 in proximity to the tag. For the example shown in FIG. 1, the broadcast beacon 126 transmitted by the tag 104 may be received by the sensors 128 located closest to the tag. The broadcast range of the tag 104 for transmitting the broadcast beacon 126 may be limited by the capabilities of the tag, such as power and energy storage, as well as the proximity of the tag to the sensors 122 in view of distance and any obstructions therebetween.

In addition to the sensors 122 and the tags 104, the floor selection system 100 further includes one or more upstream devices 130-134. The upstream device or devices 130-134 may communicate directly or indirectly with the sensors 220, and the interconnection between the upstream device(s) and the sensors may include wired and/or wireless connections. For example, the floor selection system 100 may optionally include wired or wireless gateways 130 positioned among the sensors 122 at the structure 102 in which the wired or wireless gateways may serve as a communication transponder between a hub 132, 134 and the sensors. Also, the hub 132 may be co-located with some or all sensors 122 at the structure 102 or the hub 134 may be located remote from the sensors and/or remote from the structure. For example, the hub 134 may be located in the Cloud 136 and communicate directly or indirectly with the sensors 122, at least in part, via the Internet or other communication network.

For at least some embodiments, the floor selection system 100 may operate in conjunction with other building systems to manage one or more environment control systems associated with the structure 102 based on the determined locations of the tags 104. In particular, the upstream device 130, 132 may provide a control signal to an environment control system of the structure 102 via a wired connection, wireless connection, or a combination of wired and wireless connections. The environment control system may manage an environmental condition of the structure 102 based, in whole or in part, on the locations corresponding to the tags 104. Environmental conditions managed by the environment control system include, but are not limited to, heating ventilation air conditioning ("HVAC") conditions, lighting conditions, safety conditions, and security conditions. For example, areas of the structure 102 where occupants are not detected may have lights dimmed or inactivated. Also, an HVAC system associated with a particular area may adjust ambient temperatures based on the occupancy and/or location of occupants as determined, at least in part, by the floor selection system 100.

Still referring to FIG. 1, some sensors 122 may receive the beacon 126, e.g., token, broadcast by a tag 104. Those sensors 122 may then transmit the received RF signal strength, the timestamp when the signal is received (or the sequence number of the beacon), the sensor identification, the sensor's location on a floor plan (such as [x, y] coordinates on the floor), the motion information at the time of the beacon, and the like to an upstream device 130-134. For example, the gateway 130 may collect these original signals and transmits them to the server 132, 134 for further processing. The upstream device 130-134 may determine a set of features from these initial signals. These features are derivatives from the raw signals and a plurality of them that are relevant to the decision tree stump boosting ("DTSB").

Figure 2:
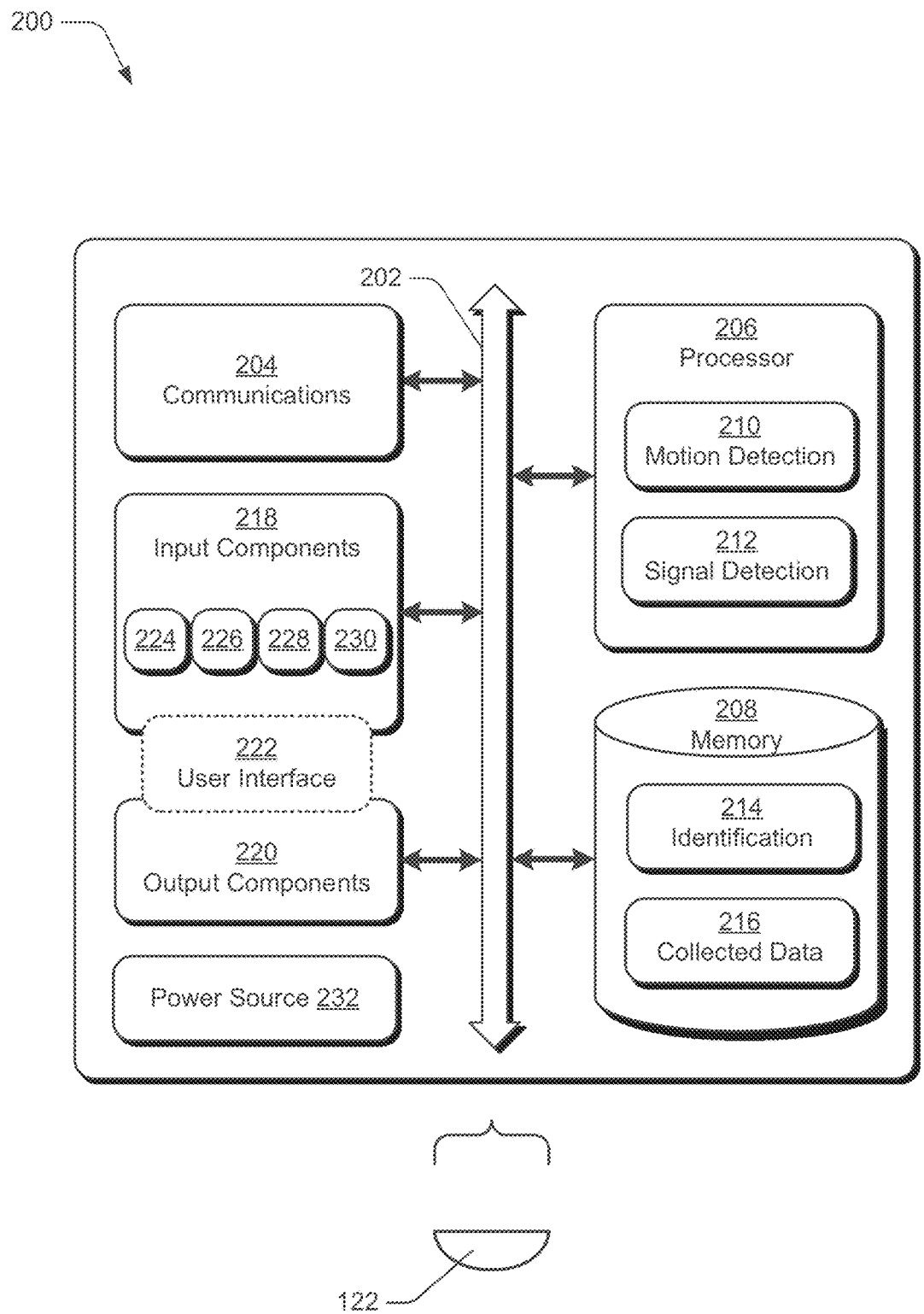
FIG. 2 is a block diagram of an example implementation of a particular sensor, of the multiple sensors shown in FIG. 1.

FIG. 2 represents example device components 200 of the sensor 122 of the floor selection system 100. A sensor 122 is any type of fixed device that may be positioned in a structure and may include wireless communication capabilities. The device components 200 of the sensor 122 comprise a communication bus 202 for interconnecting the other device components directly or indirectly, one or more communication components 204 communicating other entities via a wired or wireless network, one or more processors 206, and one or more memory components 208. The communication component 204 may utilize wireless technology for communication, such as, but are not limited to, Bluetooth (including BLE), ultrawide band (UWB), Wi-Fi (including Wi-Fi Direct), IEEE 802.15.4, Z-Wave, 6LoWPAN, Near-Field Communication, other types of electromagnetic radiation of a radio frequency wave, light-based communications (including infrared), acoustic communications, and any other type of peer-to-peer technology. The communication component 204 of the device components 200 may also utilize wired technology for communication, such as transmission of data over a physical conduit, e.g., an electrical cable or optical fiber cable.

The one or more processors 206 may execute code and process data received at other components of the device components 200, such as information received at the communication component 204 or stored at the memory component 208. The code associated with the floor selection system 100 and stored by the memory component 208 may include, but is not limited to, operating systems, applications, modules, drivers, and the like. An operating system includes executable code that controls basic functions of the sensor 122, such as interactions among the various components of the device components 200, communication with external devices via the communication component 204, and storage and retrieval of code and data to and from the memory component 208. Each application includes executable code to provide specific functionality for the processor 206 and/or remaining components of the sensor 122. Examples of applications executable by the processor 206 include, but are not limited to, a motion detection module 210 for managing operations associated with detecting motion in proximity to the sensor 122 and a signal detection module 212 for managing operations associated with detecting beacons from tags 104 and generating information for upstream devices 130-134. Data is information that may be referenced and/or manipulated by an operating system or application for performing functions of the sensor 122. Examples of data associated with the floor selection system 100 and stored by the memory component 208 may include, but are not limited to, identification data 214 associated with the sensor and collected data 216 received by the communication component 204 and/or detected by an input component (described below).

The device components 200 of each sensor 122 may further comprise one or more input components 218 and one or more output components 220. A user interface 222 of the device components 200 may include portions of the input and output components 218, 220 and be used to interact with a user of the sensor 122. For example, the user interface 222 may include a combination of hardware and software to provide a user with a desired user experience. The input and output components 218 and 220 may include sensor components to manage communications and processing with the proximal environment of the sensor 122. Examples of sensor components of the input components 218 include, but are not limited to, a motion sensor 224, a light sensor 226, a temperature sensor 228, an imager 230, air quality sensor, and other components associated with the sensor 122.

The device components 200 may further comprise a power source 232, such as a power supply or a portable battery, for providing power to the other device components 200 of each sensor 122 of the floor selection system 100.

It is to be understood that FIG. 2 is provided for illustrative purposes only to represent examples of the device components 200 of a sensor 122 and is not intended to be a complete diagram of the various components that may be utilized by the device. Therefore, sensor 122 may include various other components not shown in FIG. 2, may include a combination of two or more components, or a division of a particular component into two or more separate components, and still be within the scope of the present invention.

Figure 3:
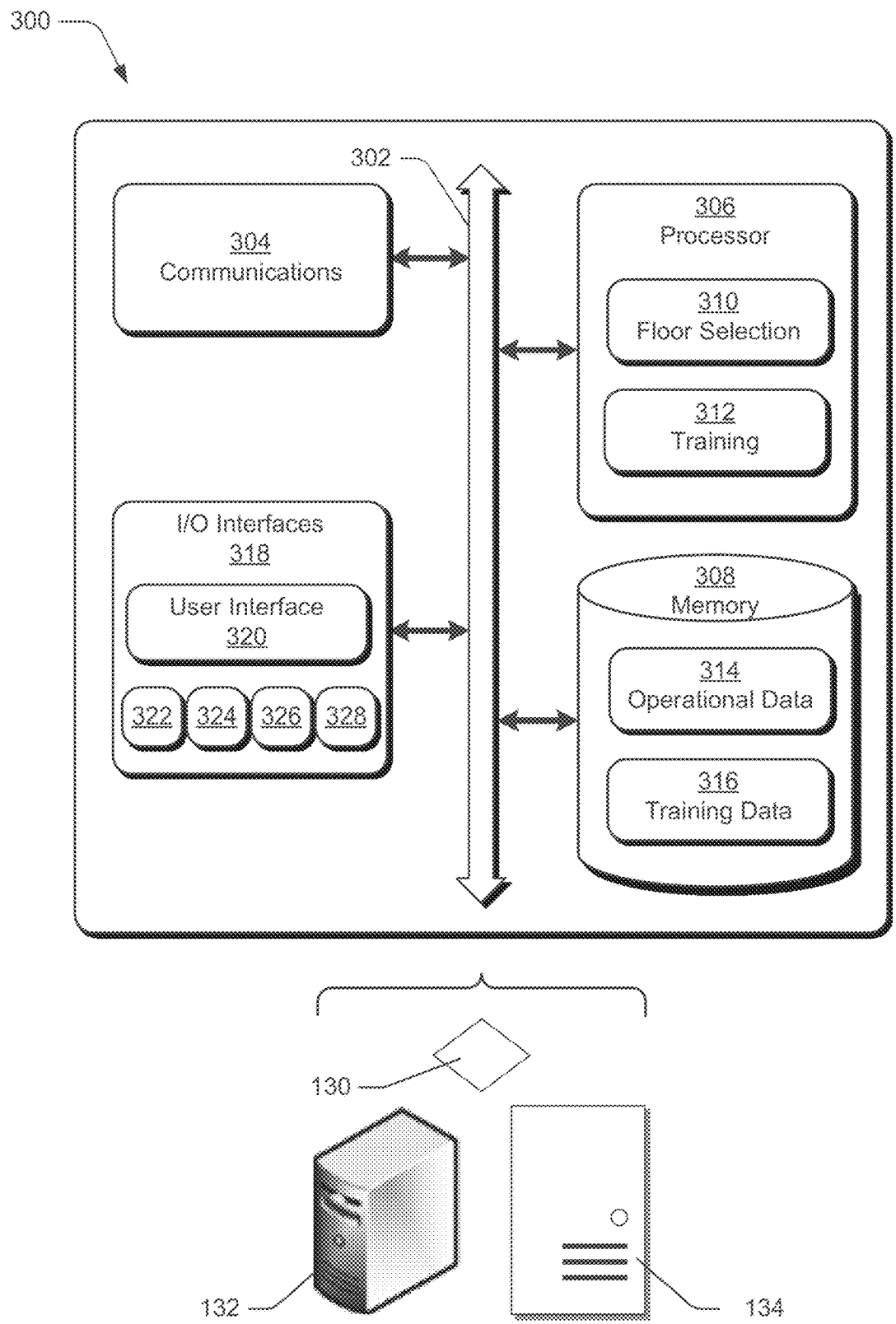
FIG. 3 is a block diagram of an example implementation of a particular upstream device, of the upstream devices shown in FIG. 1.

FIG. 3 represents example device components 300 of the upstream device 130-134 of the floor selection system 100. An upstream device 130-134 any type of fixed device that may be positioned in a structure, upstream from the sensors 122, and may include wireless communication capabilities. The device components 300 of the upstream device 130-134 comprise a communication bus 302 for interconnecting the other device components directly or indirectly, one or more communication components 304 communicating other entities via a wired or wireless network, one or more processors 306, and one or more memory components 308. For example, the communication component 304 may be configured to receive sensor data from two or more sensors. The communication component 304 may utilize wireless technology for communication, such as, but are not limited to, Bluetooth (including BLE), ultrawide band (UWB), Wi-Fi (including Wi-Fi Direct), IEEE 802.15.4, Z-Wave, 6LoW-PAN, Near-Field Communication, other types of electromagnetic radiation of a radio frequency wave, light-based communications (including infrared), acoustic communications, and any other type of peer-to-peer technology. The communication component 304 of the device components 300 may also utilize wired technology for communication, such as transmission of data over a physical conduit, e.g. an electrical cable or optical fiber cable.

The one or more processors 306 may execute code and process data received at other components of the device components 300, such as information received at the communication component 304 or stored at the memory component 308. The code associated with the floor selection system 100 and stored by the memory component 308 may include, but is not limited to, operating systems, applications, modules, drivers, and the like. An operating system includes executable code that controls basic functions of the upstream device 130-134, such as interactions among the various components of the device components 300, communication with external devices via the communication component 304, and storage and retrieval of code and data to and from the memory component 308.

Each application includes executable code to provide specific functionality for the processor 306 and/or remaining components of the upstream device 130-134. Examples of applications executable by the processor 306 include, but are not limited to, a floor selection module 310 for managing operations associated with selecting a floor for location tracking within a structure and a training module 312 for managing operations associated with training, verifying, and testing the floor selection module for upstream devices 130-134. For example, the floor selection module 310 of the processor 306 may be configured to identify a multiple features based on sensor data, determine whether individual features of the multiple features are greater than feature thresholds corresponding to the individual features, assign weights to the multiple features based on whether the individual feature of the multiple features are greater than the corresponding feature thresholds, determine whether an aggregate of the weights is greater than a resultant threshold, and select a floor location of the tag based on whether the aggregate of weights is greater than the resultant threshold. The term "individual features" is plural because the process includes multiple iterations and different features may be compared to the threshold. The floor location is selected from multiple floor locations of the structure proximal to the multiple sensors. For some embodiments, the processor 306 may generate the aggregate of the weights by repeatedly determining whether the individual features are greater than the corresponding feature thresholds and the assigning the weights to the features.

Data is information that may be referenced and/or manipulated by an operating system or application for performing functions of the upstream device 130-134. Examples of data associated with the floor selection system 100 and stored by the memory component 308 may include, but are not limited to, operational data 314 associated data stored and received for the operation of the floor selection module 310 and training data stored and received for the operation of the training module 316. For example, the operational data may include sensor data associated with the beacon 126 received from the tag 104 by the multiple sensors 128.

The device components 300 of each upstream device 130-134 may further comprise one or more input/output components, such as I/O interface 318. A user interface 320 of the device components 300 may include portions of the I/O interface 318 and be used to interact with a user of the upstream device 130-134. The I/O interface 318 may include sensor components to manage communications and processing with the proximal environment of the upstream device 130-134. Examples of sensor components of the I/O interface 318 include, but are not limited to, a visual component 322, audio component 324, mechanical component 326, and other components 328 associated with the upstream device 130-134.

It is to be understood that FIG. 3 is provided for illustrative purposes only to represent examples of the device components 300 of an upstream device 130-134 and is not intended to be a complete diagram of the various components that may be utilized by the device. Therefore, upstream device 130-134 may include various other components not shown in FIG. 3, may include a combination of two or more components, or a division of a particular component into two or more separate components, and still be within the scope of the present invention.

Features Selection

A feature set of Decision Tree-Stump Boosting ("DTSB") is generated from raw features of the sensors. There are two steps to produce the DTSB feature set: raw feature reduction and DTSB feature generation. For raw feature reduction, one or more methods may be used to reduce the features based on their relevancy to ground truth information during training phase, such as principle component analysis (PCA) and canonical-correlation analysis (CCA). DTSB feature generation produces robust, independent features from the reduced features. A set of features that is robust and location, environmental, and installation independent is created so that the features may be used in different areas or facilities without retraining the DTSB classifier. These features are used to train the DTSB classifier in the training phase and to predict the floor in the production system.

Figure 4:
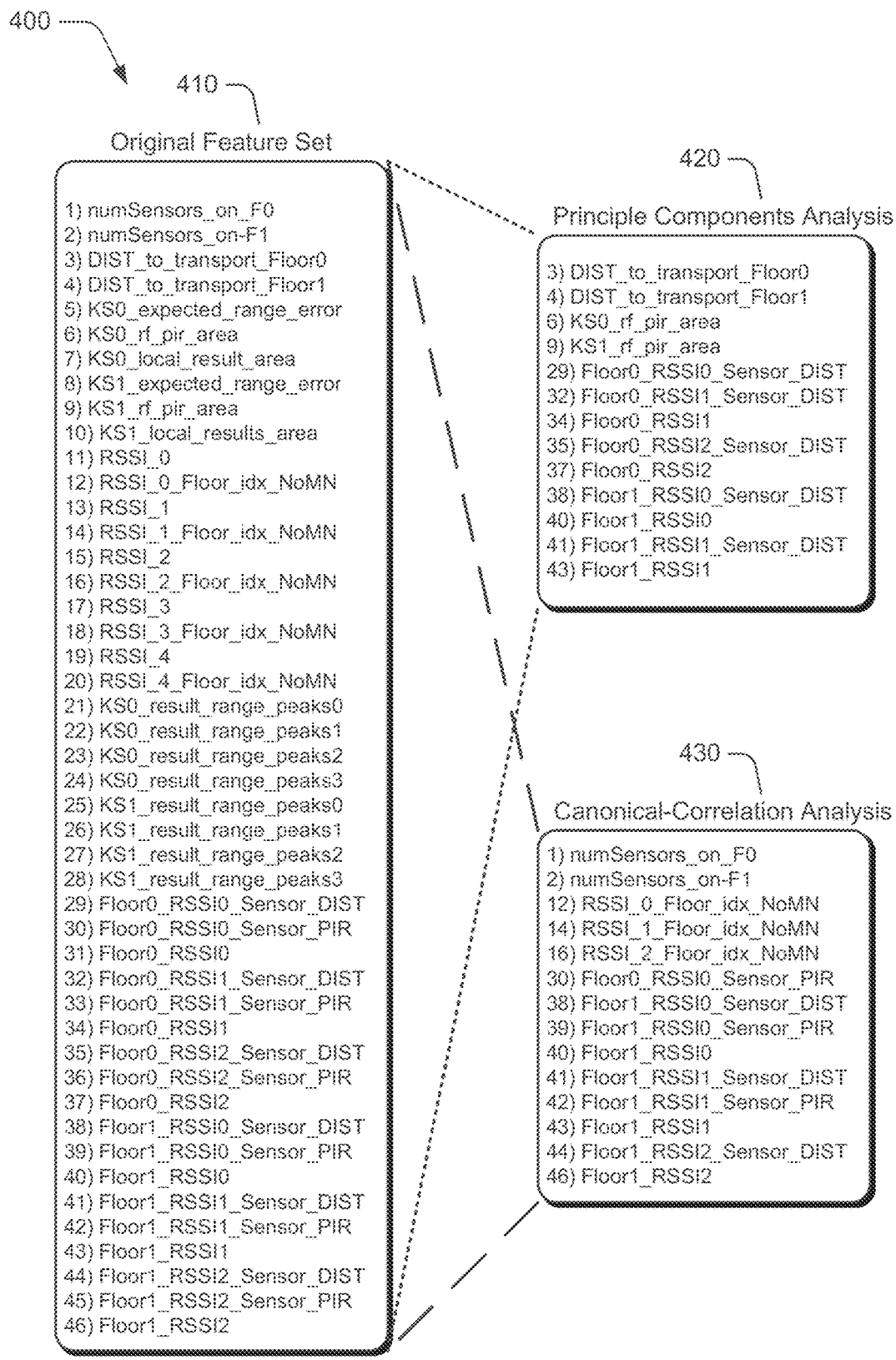
FIG. 4 depicts a tabular representation of an original feature set generated by a sensor as well as a second feature set after principle components analysis and a third feature set after canonical-correlation analysis that may be derived from the original feature set.

Referring to FIG. 4, there is shown an analysis 400 based on an original feature set 410 and two other feature sets 420, 430 derived from the original feature set. The floor selection system 100 reduces the original feature set 410 to a final feature set (shown in FIG. 5), both for training and classification. The final feature set may be determined from the original feature set 410 directly or indirectly from one or more interim feature sets. For one embodiment, the final feature set may be determined directly from the original feature set 410. For another embodiment, the final feature set may be determined indirectly from the original feature set 410 via interim feature set 420. For yet another embodiment, the final feature set may be determined indirectly from the original feature set 410 via interim feature set 430. For still another embodiment, the final feature set may be determined indirectly from the original feature set 410 via both interim feature sets 420, 430. For yet still another embodiment, the final feature set may be determined by any other means that may not relate to theses sets 410, 420, 430. The original feature set 410 is generated by each sensor 122 and provided to the upstream device 130-134. For example, as shown in FIG. 4, the original feature set 410 may include one or more of the following types of data associated separate for adjacent floors of the structure 102: number of sensors, distance to a transport, filtered values of expected range error, filtered values of an RF and motion area, filtered values of a local result area, Received Signal Strength Indication (RSSI), floor index associated with sensors produce first/second/third strongest RSSI, filtered result range peaks, strongest/second strongest/third strongest RSSI's, sensor distance for the strongest/second strongest/third strongest RSSI's, and the sensor motion for the strongest/second strongest/third strongest RSSI's. Although not part of the original features set 410, ground truth (GT) floor data used to train the floor selection system 100 may be associated with the original features set.

Based one some embodiments described above, a first interim feature set 420 may be derived from the original feature set 410 by applying a principle components analysis (PCA). The features of the first interim feature set 420 that are selected after PCA are features with at least 50% association with ground truth. As represented in FIG. 4, there are thirteen features of the original feature set 410 that are included in the first interim feature set 420.

Based one some embodiments described above, a second interim feature set 430 may be derived from the original feature set 410 by applying a canonical-correlation analysis (CCA). The features of the second interim feature set 430 that are selected after CCA are features with at least 50% positive or negative correlation. As represented in FIG. 4, there are fourteen features of the original feature set 410 that are included in the second interim feature set 430.

Figure 5:
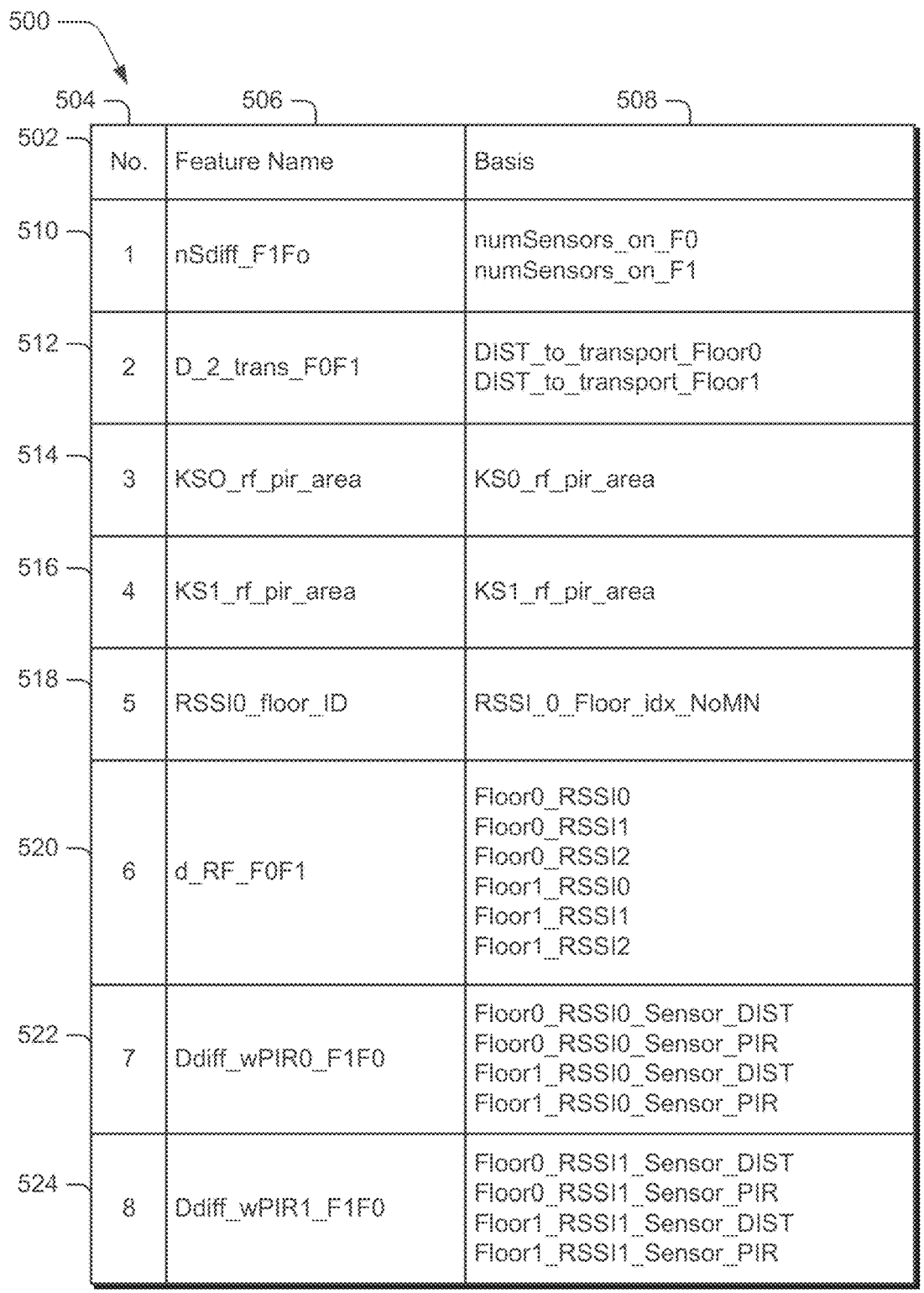
FIG. 5 depicts a tabular representation of a final feature set that may be derived from the original, second, and third feature sets of FIG. 4.

Referring to FIG. 5, the final DTSB feature set 500 used for development of the floor selection system 100 may be determined from the original feature set 410 directly, from one or more interim feature sets 420, 430, from both interim feature sets, or from a different set of features that do not related to these sets 410, 420, 430. For some embodiments, the final feature set 500 is based on the feature sets resulting from the PCA and CCA analyses and re-defined to make final features sets as portable and independent to test and implementation sites as possible. From many potential features acquired at every sampling time, one or more smaller, robust, and transferable features that are independent of building, floor height, materials may be extracted. These selected features are based on differences and ratios of the raw features, rather than the absolute values from the sensors and building measurements. For features based on RF signal strength, floor ID may be referenced rather than actual RF values.

As shown in FIG. 5, the most transferrable/scalable features are identified, i.e., the final DTSB feature set 500. The final feature set 500 is utilized for training and classifying because they are less situation dependent, thus potentially avoiding the need to retrain every time the system is installed or moved to a new structure. The original feature set 410 may include features that are most relevant to the ground truth, but these features may be dependent on the training environment and may not be as robust or transferrable to other locations. For that reason, the final feature set 500 is substantially based on the difference or the ratio between the relevant features. The features of the final feature set 500 are as independent as possible from the environment to focus on the intrinsic difference when the tag is on one floor as opposed to another floor. The horizontal header 502 also shows a feature name 506 and a basis 508 for each feature. The eight features 510-524 of the final feature set 500 are represented by rows "1" through "8". These final features are important due to their robustness and independence to various situations so a successful floor determination would be dependent upon some or all of these features.

The final feature set 500 includes a first feature 510 that is associated with a difference of a quantity of sensors between adjacent floors. The first feature 510 represents a delta between number of sensors at an upper floor of adjacent floors that receive the beacon 126 from a tag 104 and number of sensors at a lower floor of the adjacent floors that receive the beacon.

The final feature set 500 includes a second feature 512 that is associated with a difference between distances to a transport of adjacent floors. For the second feature 512, the system compares a first possible scenario where the sensor is located at an upper floor to a second possible scenario where the sensor is located at a lower floor. The second feature 512 represents a difference between a first distance of a sensor 104 from a closest transport if the sensor is assumed to be located at the upper floor and a second distance of the same sensor from a closest transport if the sensor is assumed to be located at the lower floor.

The final feature set 500 includes a third feature 514 and a fourth feature 516. Each feature is associated with an area of probability where a sensor may be located for each floor of adjacent floors. The third feature 514 represents a Kalman set of a lower floor of adjacent floors, and the fourth feature 516 represents a Kalman set of an upper floor of the adjacent floors. When determining the location of a tag, the system determines the probability where the sensor could be located at the lower floor and the probability where the sensor could be located at the upper floor. A Kalman filter is applied to the probabilities to limited variations or changes due to inherent noises in RSSI signal and the low resolution of PIR-based motion signal. The Kalman set is an area for each floor determined based on the information of the corresponding floor, such as motion data, signal strength data, and distance data.

The final feature set 500 includes a fifth feature 518 that is associated with a floor identification associated with a specific sensor of the plurality of sensors with a strongest radio frequency signal. The floor identification identifies the location of the strongest signal strength (RSSI0). In particular, the floor identification is the floor level (for example, floor 0 or 1) of the sensor, out of all sensors, that received the strongest signal strength.

The final feature set 500 includes a sixth feature 520 that is associated with a difference in sums of a plurality of radio frequency signals between adjacent floors. For example, the sixth feature 520 may represent a delta between the sum of the three strongest RF signals between the lower and upper floors of adjacent floors. Floor 0 is the lower floor, and Floor 1 is the upper floor. RSSI0 is the strongest signal, RSSI1 is the second strongest signal, and RSSI2 is the third strongest signal.

The final feature set 500 includes a seventh feature 522 and an eighth feature 524. Each feature is associated with a difference of weighted motion values of a specific, the weighted motion values being weighted by a distance from the specific sensor. The seventh feature represents the delta of the weighted motion values between the upper and lower floors for the strongest signal strength (RSSI0). The eighth feature represents the delta of the weighted motion values between the upper and lower floors for the second strongest signal strength (RSSI1). For example, the motion values may be detected by a passive infrared sensor (PIR) of each sensor. The motion values may be weighted based on the distance (DIST) of the between the tag and the corresponding sensor to accord for the importance of the measurements. The sensor reading for motion is more highly valued for a tracked object if the distance is closer. If the range is farther away, it is more likely that other factors account for the motion value rather than the tracked object.

An example of a weighting technique is provided below:

For a distance less than or equal to 25 feet, the weighting may be 1.00.

For a distance >25 and <=35 feet, the weighting may be 0.70.

For a distance >35 and <=45 feet, the weighting may be 0.40.

For a distance >45 and <=60 feet, the weighting may be 0.20.

For a distance >60 and <=100 feet, the weighting may be 0.05

For a distance greater than 100 feet, the weighting may be 0.00.

Decision Tree Stump Boosting Training and Verification

The machine learning (ML) techniques are utilized in situations where systems do not have an analytical model, and many variables of such techniques change semi-independently. The conventional ML classification techniques include ensemble classifiers, decision trees, logistic regression (LR), Naive Bayes classifier (NBC), support vector machines (SVM), artificial neural networks (ANN), and nearest neighbor classifiers (NNC). The performance of a classifier may be graded by how much it reduces entropy in the feature set. A classifier that makes a 50-50 decision on a training set would be the weakest because that classifier does not reduce the entropy in the dataset. A classifier that makes a 10% correct decision, which is wrong 90% of the time, and a classifier that makes a 90% decision, which is right 90% of the time, are equally good, provided that the classification is binary. Both classifiers reduce the entropy of the input data equally significantly, one negatively and another positively. The DTSB ensemble classifiers are reliable, robust, and may be constructed from a set of weaker classifiers (for example, a classifier that makes close to 50%) because, in real working environments, it is difficult to find strong classifiers. The complexity and changing nature of the environment also results in less robust situations to rely on strong classifiers.

Ensemble classifiers include boosting which creates a strong classifier from weak classifiers. The AdaBoost classifier is a successful technique due to characteristics of being robust to overfitting and relatively efficient with computation and memory. A variation of the AdaBoost ML classifier is the decision tree-stump boosting (DTSB) technique, which only uses tree stumps as the weak classifiers. The final classifier built on tree stumps has the simplest decision at each stage, in which the decision is one comparison with a threshold and the results are divided into two groups. Therefore, the final classifier's computational complexity is linear with the number of tree stumps.

Each weak classifier has a voting power cud associated with it. The voting power is directly correlated to the classification error rate. The final prediction of the DTSB is a voting process that combines all weak classifiers to make a strong decision.

$$H(\vec{X}) = \text{sign}\left(\sum_{i=1}^{N} \omega_i h_i(\vec{X})\right) \quad (1)$$

$$\omega_i = \frac{1}{2}\ln\left(\frac{1-\varepsilon_i}{\varepsilon_i}\right) \quad (2)$$

where, Equation (1): $\vec{X}$ is a sample in feature space; H(.) is the final DTSB classifier; h(.) is the weak classifier; N is the number of weak classifiers. sign is an operator that extracts the sign(±) of the sum operation. Equation (2): $\omega_i$ is the voting power associated with the week classifier i and $\varepsilon_i$ is the classification error rate of the is weak classifier in training.

Figure 6:
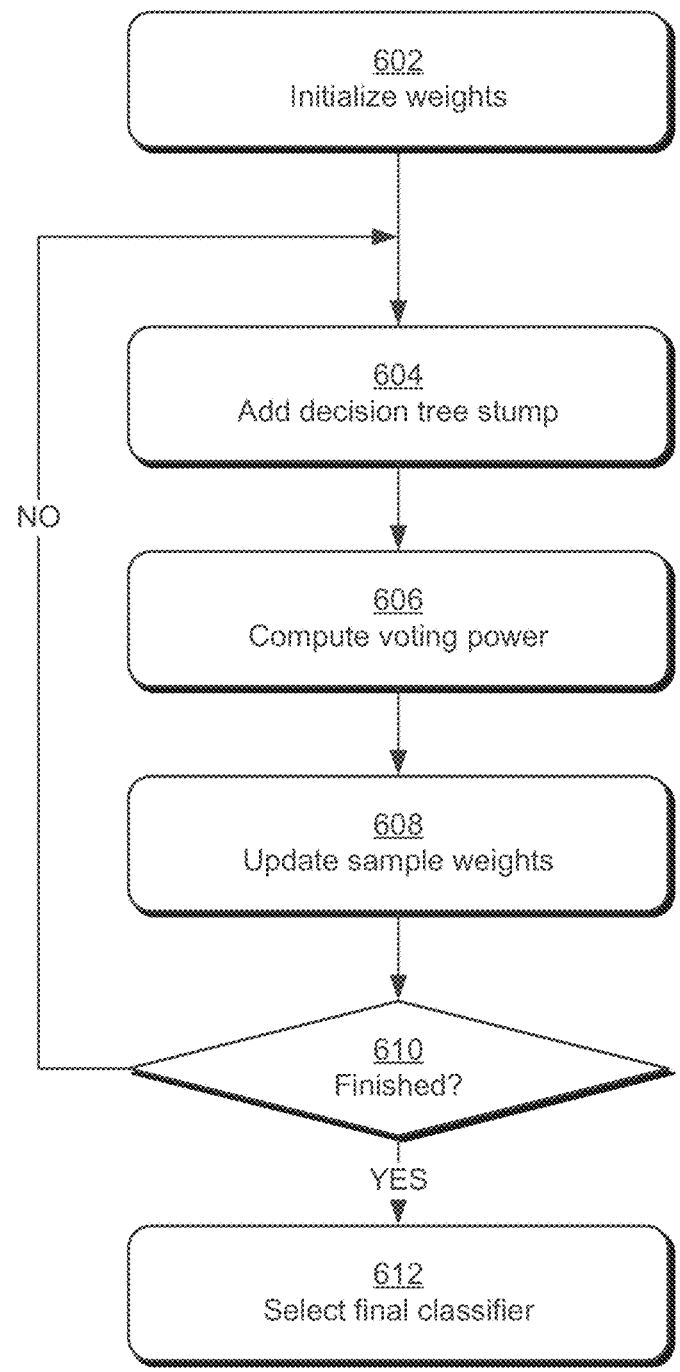
FIG. 6 is a flow diagram of an example implementation of a training operation that is operable to employ techniques described herein.

Referring to FIG. 6, for the floor selection system 100, decision trees of an ensemble classifier, such as a DTSB technique, are utilized to select the best features among all features in a complete sample set by comprehensive searching. The selection process 600 of the floor selection system 100, for training or other applications, includes an initialization of the weights of the samples (602). At the beginning of the selection process 600, the weights of all samples may be the same and thresholds may be set to zero.

The system 100 builds and adds a first tree stump to the ensemble classifier based on a training set of data (604). The system 100 may then determine which feature to put into the tree stump (604). The feature may be determined by applying all features and determining which feature reduces uncertainty or entropy the most. For example, the system 100 runs all samples through the tree stump, and also uses all the thresholds possible to determine which feature and threshold combination provides the best classification, such as best successful classification rate or lower error rate. After the feature is selected, the tree stump is added to the ensemble of classifiers with a proper voting power associate with it (606). The voting power of a selected tree stump is related to the classification error rate. The higher the error rate, the lower the voting power and vice versa, as defined in equation (2).

All samples in the training set are then weight adjusted to reflect the correctness of the classifier by decreasing the importance of correctly classified samples and increasing the importance of the incorrectly classified samples. For example, greater weight may be applied to incorrectly classified samples and lesser weight may be applied to correctly classified samples by the tree stump selected above. Weights of the training samples are updated (608) before the next tree stump is selected.

The concept of sample-weighting is to weight all samples in a training set differently based on if the weak classifier correctly classifies the sample. The correctly classified samples are generally weighted less than the miss-classified samples. The new decision trees will then focus more on the miss-classified samples. Sample-weighting is also the reason that the extra decision trees will gravitate toward the outliers, not sub-divide into the already classified clusters, that reduces the possibility of overfitting. The rules of sample-weighting are:

$$W_{i+1} = \frac{W_i e^{\alpha_i}}{Z_i} \quad (3)$$

$$Z_i = \sum_{i=1}^{N} W_{i+1} \quad (4)$$

Zi is a normalization factor that maintains $\Sigma_{i=1}^{N} W_{i+1}=1$.

As described above, a new decision tree is added (604) to the ensemble classifier for each iteration of the selection process 600. More decision trees are added, until one of the criteria listed in the next paragraph is reached (610).

After a primary selection process (604)-(608) is completed, a set of criteria is used to determine if more tree stumps are to be trained and added to the classifier ensemble. When the one of the criteria is met, training is completed, and the final classifier is selected (612) The criteria to complete the training/verification process (610) are as follow:

a preset number of stumps are successfully added to the DTSB classifier;

the classifier achieves an error rate <=5% (95% accuracy) on either training set or verification set;

the training error rate and verification error rate trend significantly differently, or divergent from one another;

when the error rate is stable (about 5%) and the system achieves a compromise between the error rate and DTSB complexity (such as, the number of stumps);

there is no good weak stump left to improve the overall performance of the DTSB classifier continuously.

Regarding the trending delta of the training error rate and the verification error rate, the selection process 600 is stopped after the verification error rate generally increases while the training error rate holds steady or continuously decreases for more than five consecutive stumps. The final ensemble of classifiers does not include the last tree stumps, such as about five tree stumps, when the above condition happens. This condition usually signals that the DTSB is overfitting the training set.

Figure 7A:
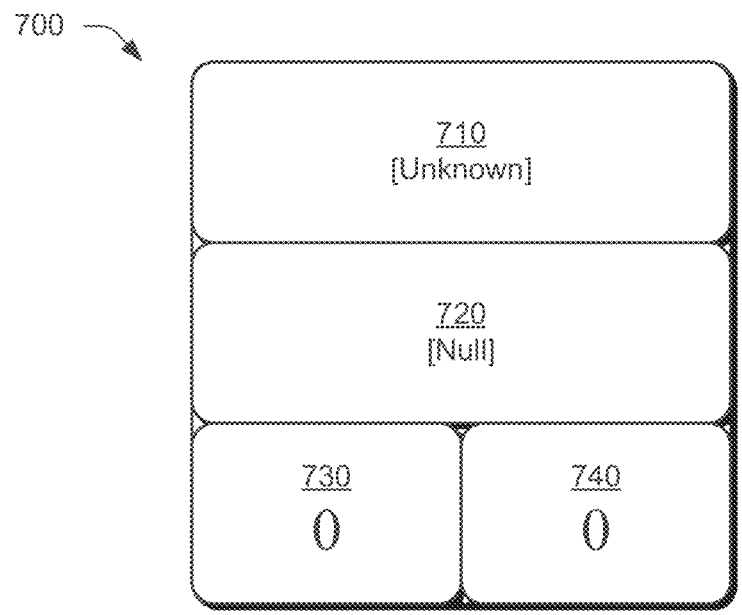
FIGS. 7A and 7B are block diagrams depicting example decision tree stumps before and after the training phase of FIG. 6.
Figure 7B:
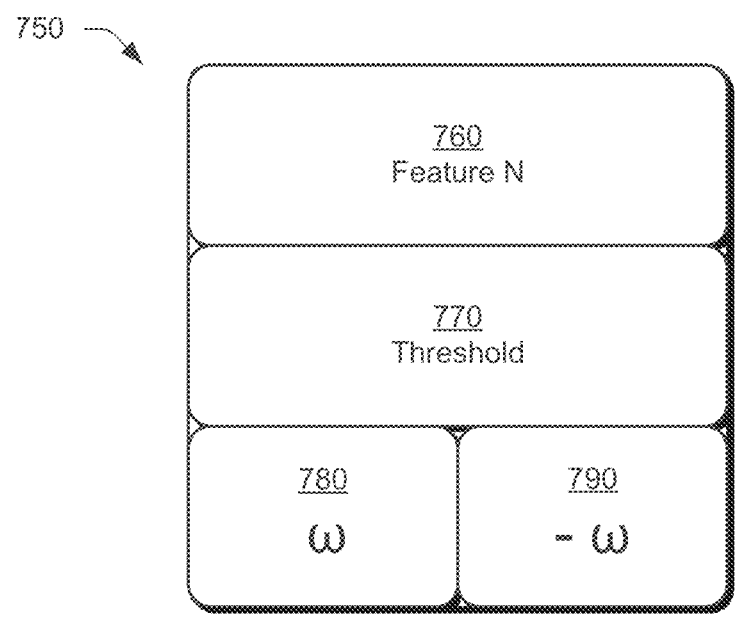

FIGS. 7A and 7B represent example decision tree stumps before and after the training phase. During the training phase, a decision tree stump is constructed with a data structure that includes a feature identification, a feature threshold, and feature voting power or weights, as illustrated by FIG. 7A. Initially, for each pre-trained decision tree stump 700, the feature identification 710 is unknown so the field for the feature identification is empty or null because the feature that reduces entropy the most is not yet known. For similar reasons, the feature threshold 720 and the weights 730, 740 are also unknown and set initially to a null value. After the training phase, each trained decision tree stump 750 that is included in the final DTSB has the parameters setup, namely the feature identification 760, the feature threshold 770, and the feature weights 780, 790 as illustrated by FIG. 7B. Regarding the weights 780, 790, an output of each decision tree stump is w, which for example may be positive if feature N is less than the threshold and negative if the feature N is greater than or equal to the feature threshold. The voting weight w may be computed based on equation (2) above.

Figure 8:
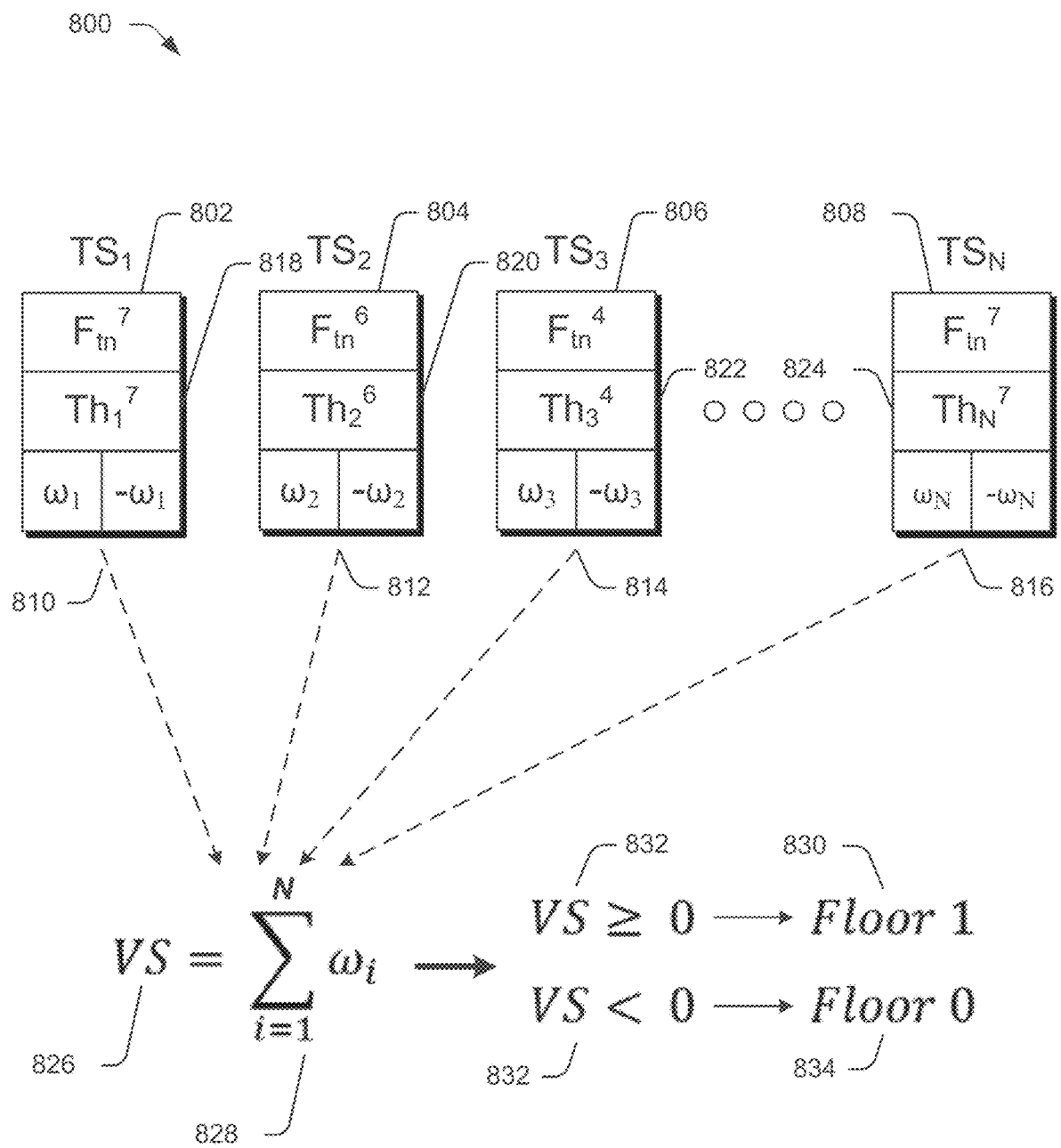
FIG. 8 is a process diagram depicting a classifier having several representative decision tree stumps arranged in an order as trained by the training process of FIG. 6.

Referring to FIG. 8, there is shown a data structure of the DTSB in a classification application, after training as described above. The classifier 800 has several decision tree stumps 802-808 arranged in an order as trained, once the training process is complete. In production or runtime, when the classifier 800 is used to determine the appropriate floor for any given sampling period, the final DTSB feature set with multiple features (such as the eight shown in FIG. 5) are fed to each decision tree stump 802-808 to produce a weight u 810-816 based on the feature threshold 818-824. The final floor determination for the DTSB system is a voting 826 based on a combination 828 (such as a summation) all the weights 810-816, as demonstrated in FIG. 8. For example, the voting system 826 may determine an upper floor 830 where a value 832 generated by the voting system 826 is greater than or equal to zero and determine a lower floor 834 where the value generated by the voting system is less than zero.

For some embodiments, extra robustness and increased accuracy may be provided by adding a filter layer on top of the DTSB system. For example, the filter may collect a set of previous DTSB decisions as well as the current DTSB decision and execute a voting process again, with equal, or reducing voting weights, as represented by:

$$\text{Floor} = \text{sign}(\Sigma_{i=1}^{n} = \beta_i H_i(\vec{X})) \quad (5)$$

Where $\beta_i$ is the voting weight of DTSB decision at sample time i. $H_i(\vec{X})$ is the DTSB decision at sampling time i, with i=1 at current time and i=2, . . . , n at previous sampling times. Care must be taken to avoid dead lock resulting from $\Sigma_{i=1}^{n} \beta_i H_i(\vec{X}) = 0$. When $\beta_i = 1$, the dead lock is avoided by making sure n is an odd number, for example, n=7 in one embodiment.

Figure 9:
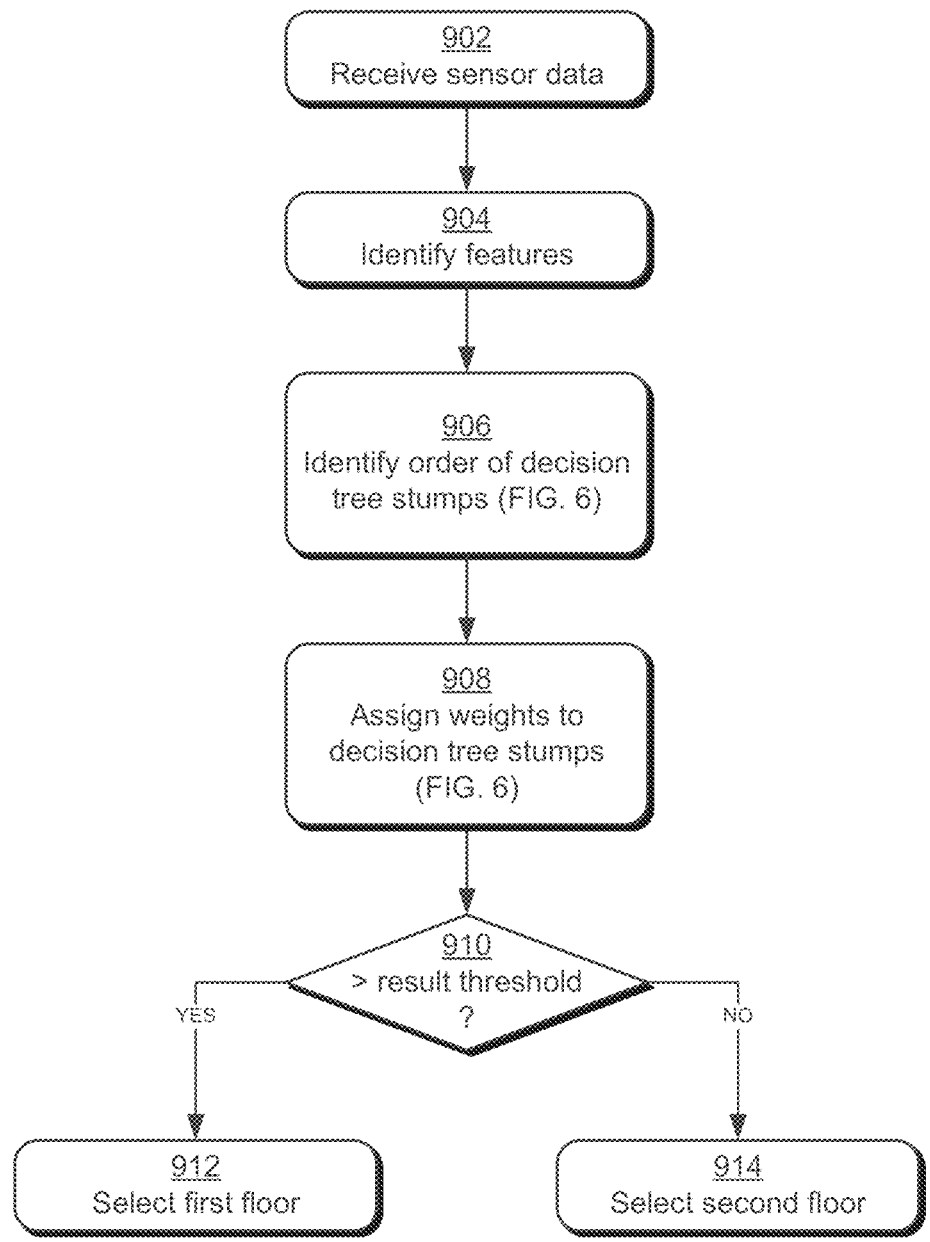
FIG. 9 is a flow diagram of an example implementation of a classification operation that is operable to employ techniques described herein.

Referring to FIG. 9, there is shown a program flow of the DTSB in a classification application, after training as described above. For the embodiment depicted by FIG. 9, the program flow is a floor selection method 900 for location tracking within a structure. The process of classifying includes the selection process 600 described above in reference to FIG. 6. The upstream device 130-134 receives sensor data from multiple sensors 122 (702). The sensor data is associated with a beacon 126 received from a tag 104 by the sensors 128. Next, the upstream device 130-134 identifies multiple features in response to receiving the sensor data from the sensors (904). The multiple features may be determined by the floor selection system 100 in advance of the floor selection method 900, such as the processes described above in reference to FIGS. 4 and 5. Thus, the floor selection system 100 may identify the multiple features by retrieving them from a memory component 308 or receiving them from via a communications component 304. Examples of individual features that may be included in the multiple features include, but are not limited to, a difference of a quantity of sensors between adjacent floors, a difference between distances to a transport of adjacent floors, an area of probability where a sensor may be located for each floor of adjacent floors, a floor identification associated with a specific sensor of the sensors with a strongest radio frequency signal, a difference in sums of radio frequency signals between adjacent floors, a difference of weighted motion values of a specific sensor, the weighted motion values being weighted by a distance from the specific sensor.

For the floor selection method 900 of FIG. 9, a particular order for the decision tree stumps is determined (906) using the selection process 600 represented by FIG. 6. During the training process, the floor selection system 100 generates multiple decision tree stumps in which each decision tree stump has a data structure that includes a feature identification, a feature threshold, and feature voting power or weights. The floor selection system 100 arranges the decision tree stumps based on a particular order as trained during the training process.

Further for the floor selection method 900, the upstream device 130-134 assigns weights to the multiple features (908) which, similar to the previous identification of the order of decision tree stumps, may use the selection process 600 represented by FIG. 6. The upstream device 130-134 may assign a weight to the multiple features in response to determining that the individual features of the multiple features are greater than the corresponding feature thresholds. The operation may be repeated numerous times by comparing the same or different features, with the same or different thresholds, resulting in a set of weights. For example, the aggregate of the weights may be generated by repeatedly determining whether the individual features are greater than the corresponding feature thresholds and assigning the weights to the corresponding decision tree stumps.

In response to assigning weights (908), the upstream device 130-134 may determine whether an aggregate of the weights is greater than a resultant threshold (910). For example, the aggregate may be a summation of the resulting set of weights. The upstream device 130-135 may thereafter select a floor location of the tag in response to determining whether the aggregate of weights is greater than the result threshold (912, 914). For example, the upstream device 130-135 may select a first floor location of the tag in response to determining that the aggregate of weights is greater than the result threshold (912). As another example, the upstream device 130-135 may select a second floor location of the tag in response to determining that the aggregate of weights is not greater than the result threshold (914). The floor location may be selected from multiple floor locations of the structure proximal to the sensors.

Those skilled in the art will recognize that, for simplicity and clarity, the full structure and operation of all data processing systems suitable for use with the present disclosure are not being depicted or described herein. Also, none of the various features or processes described herein should be considered essential to any or all embodiments, except as described herein. Various features may be omitted or duplicated in various embodiments. Various processes described may be omitted, repeated, performed sequentially, concurrently, or in a different order. Various features and processes described herein can be combined in still other embodiments as may be described in the claims.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an example embodiment of the present disclosure has been described in detail, those skilled in the art will understand that various changes, substitutions, variations, and improvements disclosed herein may be made without departing from the spirit and scope of the disclosure in its broadest form.

What is claimed is:

1. A floor selection system for location tracking within a structure comprising:
    a communication component configured to receive sensor data from a plurality of sensors, the sensor data being associated with a beacon received from a tag by the plurality of sensors; and
    a processor configured to identify a plurality of features based on the sensor data, identify a plurality of decision tree stumps arranged in a particular order, assign weights to the plurality of decision tree stumps based on the plurality of features and a plurality of feature thresholds of the plurality of decision trees, determine whether an aggregate of the weights is greater than a resultant threshold, and select a floor location of the tag based on whether the aggregate of weights is greater than the resultant threshold,
    wherein the plurality of features include a difference between distances to a transport of adjacent floors,
    wherein the plurality of features are derived from an original feature set and have at least 50% association with ground truth, and
    wherein the floor location is selected from a plurality of floor locations of the structure proximal to the plurality of sensors.

2. The floor selection system as described in claim 1, wherein the processor gene rates the aggregate of the weights by repeatedly executing the assigning the weights to the plurality of decision tree stumps.

3. The floor selection system as described in claim 1, wherein the plurality of features includes a difference of a quantity of sensors between adjacent floors.

4. The floor selection system as described in claim 1, wherein the plurality of features include an area of probability where a sensor may be located for each floor of adjacent floors.

5. The floor selection system as described in claim 1, wherein the plurality of features include a floor identification associated with a specific sensor of the plurality of sensors with a strongest radio frequency signal.

6. The floor selection system as described in claim 1, wherein the plurality of features include a difference in sums of a plurality of radio frequency signals between adjacent floors.

7. The floor selection system as described in claim 1, wherein the plurality of features include a difference of weighted motion values of a specific sensor, the weighted motion values being weighted by a distance from the specific sensor.

8. The floor selection system as described in claim 1, wherein the weights and the corresponding feature thresholds are determined by using decision tree stumps as weak classifiers.

9. The floor selection system as described in claim 1, wherein the processor assigns the weights to the plurality of decision tree stumps by determining whether the individual features of the plurality of features are greater than the corresponding feature thresholds for each decision tree stump.

10. A floor selection method for location tracking within a structure comprising:
    receiving sensor data from a plurality of sensors, the sensor data being associated with a beacon received from a tag by the plurality of sensors;
    identifying a plurality of features in response to receiving the sensor data from the plurality of sensors, wherein the plurality of features include a difference between distancesto a transport of adjacent floors, wherein the plurality of features are derived from an original feature set and have at least 50% association with ground truth;
    identifying a plurality of decision tree stumps arranged in a particular order, the plurality of decision tree stumps including a plurality of feature thresholds;
    assigning weights to the plurality of decision tree stumps based on the plurality of features and the plurality of feature thresholds;
    determining whether an aggregate of the weights is greater than a resultant threshold; and
    selecting a floor location of the tag in response to determining whether the aggregate of weights is greater than the resultant threshold, wherein the floor location is selected from a plurality of floor locations of the structure proximal to the plurality of sensors.

11. The floor selection method as described in claim 10, further comprising generating the aggregate of the weights by repeatedly executing the assigning of the weights to the plurality of decision tree stumps.

12. The floor selection method as described in claim 10, wherein identifying the plurality of features includes identifying a particular feature of the plurality of features as a difference of a quantity of sensors between adjacent floors.

13. The floor selection method as described in claim 10, wherein identifying the plurality of features includes identifying a particular feature of the plurality of features as an area of probability where a sensor may be located for each floor of adjacent floors.

14. The floor selection method as described in claim 10, wherein identifying the plurality of features includes identifying a particular feature of the plurality of features as a floor identification associated with a specific sensor of the plurality of sensors with a strongest radio frequency signal.

15. The floor selection method as described in claim 10, wherein identifying the plurality of features includes identifying a particular feature of the plurality of features as a difference in sums of a plurality of radio frequency signals between adjacent floors.

16. The floor selection method as described in claim 10, wherein identifying the plurality of features includes identifying a particular feature of the plurality of features as a difference of weighted motion values of a specific sensor, the weighted motion values being weighted by a distance from the specific sensor.

17. The floor selection method as described in claim 10, further comprising determining the weights and the corresponding feature thresholds by using decision tree stumps as weak classifiers.

18. The floor selection method as described in claim 10, wherein assigning the weights to the plurality of decision tree stumps includes determining whether the individual features of the plurality of features are greater than the corresponding feature thresholds for each decision tree stump.

* * * * *